Figure 1:
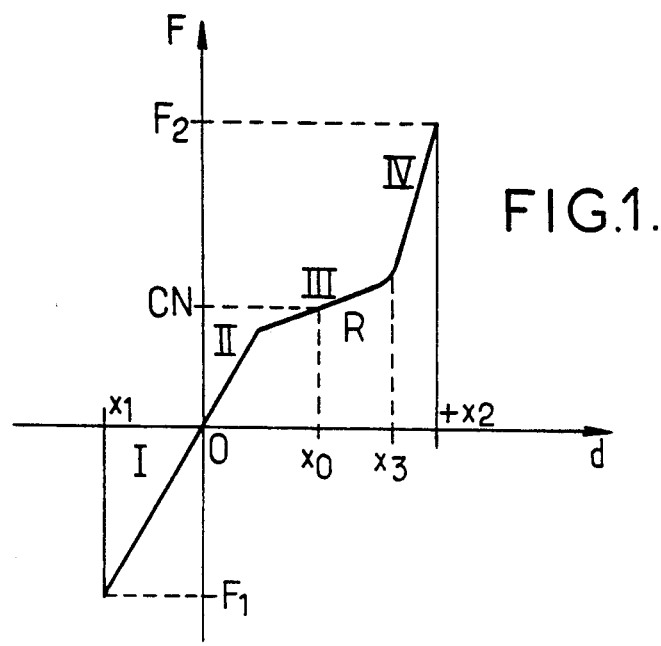

United States Patent [19]

Simon et al.

[11] Patent Number: 5,271,595
[45] Date of Patent: Dec. 21, 1993

[54] RESILIENT SUPPORT DEVICE HAVING A NON-LINEAR ELASTIC CHARACTERISTIC

[75] Inventors: Jean-Michel Simon, Clarmant; Jean-Pierre Ciolczyk, Chalette sur Loing, both of France

[73] Assignee: Hutchinson, France

[21] Appl. No.: 932,229

[22] Filed: Aug. 19, 1992

[30] Foreign Application Priority Data

Sep. 2, 1991 [FR] France ................ 91 10832

[51] Int. Cl.$^5$ .............................. F16M 13/00
[52] U.S. Cl. ..................... 248/632; 180/291; 248/60; 248/610; 267/141.1
[58] Field of Search ........... 248/632, 635, 610, 562, 248/60, 613; 267/141.2, 141.1, 141.3, 141.4, 141.6, 140.11; 180/291, 312

[56] References Cited

U.S. PATENT DOCUMENTS

| | | | |
|---|---|---|---|
| 3,161,252 | 12/1964 | Brown | 180/291 |
| 4,116,411 | 9/1978 | Masuda | 248/60 |
| 4,660,797 | 4/1987 | Tonnies | 248/610 |
| 4,727,957 | 3/1988 | Fujita | 267/141.1 X |
| 4,817,909 | 4/1989 | Deane | 267/152 X |
| 4,884,779 | 12/1989 | Drabing | 248/610 |
| 4,893,778 | 1/1990 | Drabing | 248/60 X |
| 5,050,837 | 9/1991 | Hamada | 248/610 |

FOREIGN PATENT DOCUMENTS

| | | |
|---|---|---|
| 0054493 | 6/1982 | European Pat. Off. . |
| 0315805 | 5/1989 | European Pat. Off. . |
| 0324693 | 7/1989 | European Pat. Off. . |
| 0411246 | 2/1991 | European Pat. Off. . |
| 675502 | 5/1939 | Fed. Rep. of Germany . |
| 1505498 | 9/1969 | Fed. Rep. of Germany . |
| 8714888 | 2/1988 | Fed. Rep. of Germany . |
| 1434349 | 2/1966 | France . |
| 131845 | 7/1978 | German Democratic Rep. ............ 248/610 |

*Primary Examiner*—J. Franklin Foss
*Attorney, Agent, or Firm*—Larson & Taylor

[57] ABSTRACT

A resilient support device having a non-linear elastic characteristic, the device being of the type constituted by a body 1 of resilient material provided with two couplings members 6a and 6b for coupling firstly to a support 7 and secondly to a mass F to be supported, the coupling members 6a and 6b being resiliently linked together by two relatively rigid branches 8 and 9 of said body 1. The branches 8 and 9 are connected to each other by at least one resilient crosspiece 2 that is pre-stressed in traction and that is suitable for buckling when the force applied between said coupling members 6a and 6b reaches a predetermined value x3, the coupling deformation of the crosspiece(es) 2 being stopped by an abutment system 5 of relatively high stiffness. An application of the device is as an exhaust pipe support.

8 Claims, 1 Drawing Sheet

RESILIENT SUPPORT DEVICE HAVING A NON-LINEAR ELASTIC CHARACTERISTIC

The present invention relates to a resilient support device having a non-linear elastic characteristic.

The term "non-linear elastic characteristic" is used to mean that the stiffness of the device must be capable of varying with the force exerted thereon. More particularly, different stiffnesses must be available in different, well-defined operating ranges.

For example, with a resilient suspension device for a vehicle exhaust pipe, the graph of traction force F as a function of vertical displacement d of the pipe should ideally be of the type shown in FIG. 1. In the "normal operation" range III which extends on either side of the rest point R corresponding to the nominal load CN when the pipe is in its rest position $x_0$, the stiffness of the device should be low (the slope of $F=f(d)$ should be of low value), thereby filtering the vibrations of the pipe, while transmitting a minimum amount of vibration to the vehicle body. In contrast, if the downwards traction force increases, e.g. due to a severe bump in the surface on which the vehicle is running, the stiffness of the device must suddenly become much greater so as to limit the downwards displacement of the exhaust pipe, for example to prevent it striking the surface of the road. That is represented in portion IV of the graph where it can be seen that the slope of the curve increases sharply.

For the same reason, i.e. limiting displacements of the exhaust pipe, but this time upwards, the slope must also be much steeper in zones I and II that come before the zone III, and in such a manner as to obtain a maximum displacement amplitude $x_1-x_2$ which is not prohibitive given the relatively limited amount of space available between the bottom of the vehicle body and the road surface. The fact that the zone I–II extends on either side of the point O also shows the need to obtain prestress in the upwards vertical direction to compensate for the weight of the exhaust pipe, which must be done without requiring excessive displacement.

The object of the present invention is therefore to obtain a resilient support device, in particular a suspension device, having the characteristics as defined above, and to do this as simply as possible. In particular, the device should be easy to mass produce and it should be cheap.

To this end, the present invention provides a resilient support device of the type defined above, the device being constituted by a body made of a resilient material and provided with two coupling members for coupling respectively to a support and to a mass to be supported, resilient connection between said members being provided by two relatively rigid branches of said body, said branches thus acting in parallel, the device being essentially characterized in that said branches are connected to each other by at least one resilient crosspiece that is prestressed in traction and that is suitable for buckling when the forces applied between said coupling members reach a predetermined value, the buckling deformation of said crosspiece(es) being stopped by an abutment system of relatively high stiffness.

Figure 2:
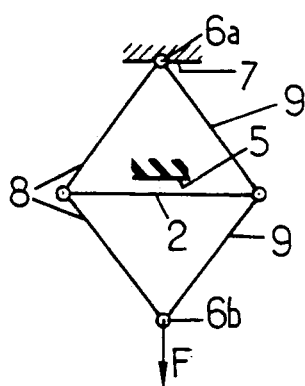
Figure 3:
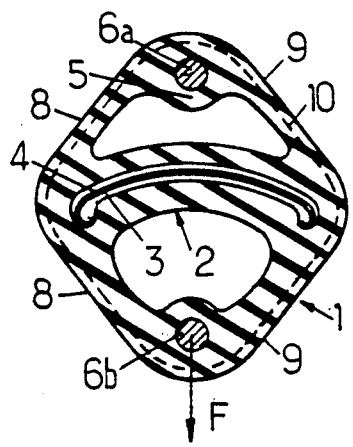
Figure 4:
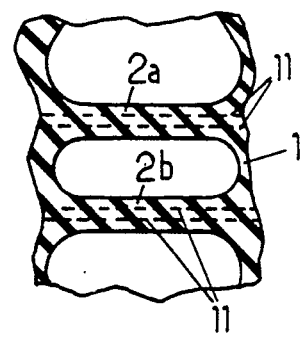
Figure 5:
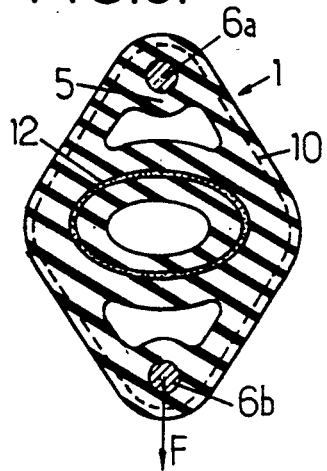
Figure 6:
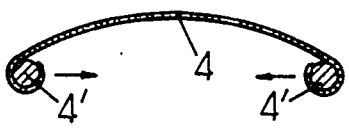
Figure 7:
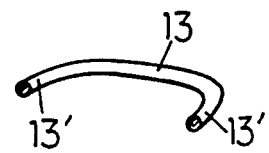

The operation of such a device, and an implementation and variants thereof are described below by way of non-limiting examples, with reference to the other figures of the accompanying drawing, in which:

FIG. 1 is a graph illustrating the dynamics of the operation of the device;
FIG. 2 is a theoretical diagram of the device;
FIG. 3 is a section through a first embodiment;
FIGS. 4 and 5 show variant embodiments;
FIG. 6 is a diagram of a crosspiece having reinforced ends; and
FIG. 7 shows a variant crosspiece in the form of a resilient staple.

In FIG. 2, and where appropriate in the other figures, references 6a and 6b designate coupling members of the device, firstly for coupling to a support 7, e.g. the body of a vehicle having an internal combustion engine, and secondly for coupling to a suspended mass, e.g. the exhaust pipe of the vehicle, and symbolized merely by an arrow F representing the force (weight and inertia) developed by the suspended mass.

The coupling members 6a and 6b are connected to each other by two branches 8 and 9 that are relatively rigid in traction and that are consequently disposed in parallel. These two branches are themselves connected to each other approximately via their respective middle portions by means of a resilient crosspiece 2 that is prestressed in traction.

This crosspiece is designed to buckle when the forces acting between the coupling members 6a and 6b (in this case traction forces) reach the predetermined value represented by $x_3$ in the graph of FIG. 1.

By imparting initial curvature to the crosspiece 2, it can be ensured that it buckles one way only, so that it moves suddenly to bear against a very stiff resilient abutment, represented by 5 in FIG. 2.

The operation of such a device is then as follows: around the point CN (FIG. 1) the crosspiece 2 provides relatively weak elastic resistance to the compression forces acting between its ends, thus providing the system with the relatively low stiffness desired between the members 6a and 6b in the zone III of FIG. 1. A low stiffness "normal operating" range III is thus obtained on either side of the rest point R. In contrast, when the traction forces F acting between the coupling members 6a and 6b reach the predetermined value $x_3$, then the compression forces acting on the ends of the crosspiece 2 also reach a limit, such that the crosspiece buckles, and its central region comes suddenly to bear against the very stiff resilient abutment 5. This provides the high stiffness of the zone IV.

It will be understood that the traction prestress of the crosspiece 2 enables the high stiffness zones I and II in the graph of FIG. 1 to be obtained since the prestress requires a traction force of $|CN|+|F1|$, corresponding to the weight of the exhaust pipe, to be applied to the device in order to bring it to its operating point R.

In the embodiment of FIG. 3, the coupling members 6a and 6b are constituted by steel hooks appropriately connected, e.g. to the body and to the exhaust pipe of a vehicle. These hooks pass through holes provided in the junction zones between the two parallel-connected branches 8 and 9 of a body 1 made of an elastomer or of an analogous material. The body 1 is in the form of a plate and may easily be obtained by extruding an elastomer and then slicing up extrusion, i.e. it can be mass produced at low cost.

The body 1 includes a curved crosspiece 2 with its convex side facing upwards, integrally formed with the branches 8 and 9, and processing a housing in the form of an arcuate slot 3 in which a spring 4 made of metal or of composite material is installed. The spring is normally required to exert traction prestress between the middle zones of the branches 8 and 9 for the reason mentioned above. It is therefore arcuate in shape, requiring to be squeezed (i.e. to have its curvature increased) for insertion into said housing 4. To facilitate this operation, as shown in FIG. 6, it is possible to slide reinforcements 4' into the rolled-over ends of the spring, thereby making it easier to squeeze the spring, insert it, and then retain it in the housing 3.

Returning to FIG. 3, it can be seen that an annular reinforcement 10 made of fabric (nylon, fiberglass, ...) is also included in the branches of the body 1 passing around the coupling members 6a and 6b and thus increasing the traction strength of the resilient branches 8 and 9. Finally, the above-mentioned abutment 5 is constituted in this case by a swelling on the body 1 situated beneath the hold for the coupling member 6a. Because the convex side of the crosspiece 2 faces upwards it will be understood that it can buckle only towards the abutment 5, thereby providing the zone of high stiffness referenced IV in FIG. 1.

The fragmentary section of FIG. 4 shows the possibility of using a crosspiece 2 constituted by two spaced-apart beams 2a and 2b that are reinforced by pieces of fabric 11.

The variant of FIG. 5 shows the possibility of installing a tubular reinforcing member 12 in the central portion of the elastomer body 1, e.g. a member made of composite material and also suitable for buckling under the effect of the compression forces that act transversely on the body 1 when the traction forces acting between the coupling members 6a and 6b reach the predetermined value $x_3$.

Finally, FIG. 7 shows the possibility of replacing the arcuate spring 4 by a resilient metal staple 13 whose ends 13' are engaged in corresponding through holes in the body 1, which staple may also be shaped to exert the desired traction prestress on the body 1.

We claim:

1. A resilient support device having a non-linear elastic characteristic, the device comprising a body made of a resilient material and provided with two coupling members for coupling respectively to a support and to a mass to be supported, resilient connection between said members being provided by two relatively rigid branches of said body, said branches acting in parallel, the device further comprising at least one resilient crosspiece for connecting said branches that is prestressed in traction and that is capable of buckling when the forces applied between said coupling members reach a predetermined value, the buckling deformation of said at least one crosspiece being limited by an abutment system of relatively high stiffness.

2. A device according to claim 1, wherein said crosspiece is curved, with its convex side facing said abutment system.

3. A device according to claim 1 wherein said crosspiece includes a housing for a metal spring or the like which is prestressed in compression.

4. A device according to claim 3, further comprising reinforcements engaged in rolled ends of said spring.

5. A device according to claim 1, wherein said crosspiece comprises two spaced-apart and reinforced beams.

6. A device according to claim 1, wherein said crosspiece comprises a tubular member.

7. A device according to claim 1, wherein said crosspiece includes a resilient staple.

8. A device according to claim 1, wherein an annular reinforcement is included in the branches of said body of resilient material, said reinforcement surrounding said coupling members.

* * * * *